(12) United States Patent
Gujar et al.

(10) Patent No.: US 12,476,986 B2
(45) Date of Patent: Nov. 18, 2025

(54) SYSTEM AND METHOD FOR DETECTING AND NEUTRALIZING SECURITY ATTACKS IN BLOCKCHAINS

(71) Applicant: International Institute of Information Technology, Hyderabad, Hyderabad (IN)

(72) Inventors: Sujit Gujar, Hyderabad (IN); Varul Srivastava, Prayagraj (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 145 days.

(21) Appl. No.: 18/402,598

(22) Filed: Jan. 2, 2024

(65) Prior Publication Data

US 2024/0236119 A1    Jul. 11, 2024

(30) Foreign Application Priority Data

Jan. 5, 2023   (IN) .............................. 202341001018

(51) Int. Cl.
*H04L 9/40*   (2022.01)
(52) U.S. Cl.
CPC ................ *H04L 63/1416* (2013.01)

(58) Field of Classification Search
CPC .................................................. H04L 63/1416
See application file for complete search history.

(56) References Cited

U.S. PATENT DOCUMENTS

| 2020/0076827 | A1* | 3/2020 | Gluck | H04L 9/50 |
| 2020/0145223 | A1* | 5/2020 | Yang | H04L 63/08 |
| 2020/0296130 | A1* | 9/2020 | Xie | H04L 63/1416 |
| 2022/0414664 | A1* | 12/2022 | Liu | G06Q 20/4016 |

* cited by examiner

*Primary Examiner* — William R Korzuch
*Assistant Examiner* — Matthias Habtegeorgis

(57) ABSTRACT

The present disclosure provides a system for detecting and neutralizing a plurality of security attacks on a blockchain network to improve security of the blockchain network. The system includes a sender node that is configured to send a transaction to a user device associated with at least one user. The blockchain network is configured to (i) receive the transaction from the sender node when the first block gets validated in the first blockchain, (ii) validate the transaction of the first block to neutralize the first attack, (iii) determine a second attack by initiating a split in the first blockchain to determine a second blockchain, and (iv) invalidate the second blockchain when the latest block of the first blockchain invalidates the second block of the second blockchain when a proof of invalidity (POI) is added to the second block to neutralize the second attack.

9 Claims, 4 Drawing Sheets

SYSTEM AND METHOD FOR DETECTING AND NEUTRALIZING SECURITY ATTACKS IN BLOCKCHAINS

CROSS-REFERENCE TO RELATED APPLICATIONS

This patent application claims priority to pending Indian provisional patent application no. 202341001018 filed on Jan. 5, 2023, the complete disclosures of which, in their entirety, are hereby incorporated by reference.

BACKGROUND

Technical Field

The present disclosure relates generally to a blockchain, and more particularly, the present disclosure relates to securing a proof-of-work by analyzing one or more possible attacks in the blockchain network using game theory.

Description of the Related Art

A blockchain is a distributed ledger database that includes records of transactions and related information, encrypted for security. The blockchain network achieves a majority consensus on transactions through a validation process, and the information is stored in sealed blocks. These blocks are linked together using cryptographic techniques, recording information from the previous block in each subsequent block. Once confirmed enough times, the blocks become nearly impossible to alter. In proof of work (PoW), each node must solve a cryptographic puzzle to write to the blockchain, a process known as mining. Nodes, referred to as miners, submit queries to solve the puzzle, with success determined by solving the puzzle. However, new-age security attacks are emerging, which are highly sophisticated and can cause significant irreparable damage.

An existing blockchain method asserts that for distributed consensus in the presence of Byzantine adversaries, no more than ⅓ of nodes should be adversarial. The FLP impossibility theorem states that a deterministic algorithm cannot achieve consensus in an asynchronous system, even if a single node is faulty. Blockchains, as decentralized systems, introduce incentive-based security through cryptocurrency. They utilize a Proof of Work (PoW) consensus algorithm to ensure consistency. The process of growth (mining a block) is probabilistic in each round, where each query increases the probability of mining a new block.

Another existing blockchain method, the Rational Protocol Design Model (RPD), analyzes rational protocols using game theory, considering everyone as a player in the n-player game. However, such an analysis fails to capture coalitions and does not model protocol designers. In RPD, the game is a two-player zero-sum Stackelberg game between the protocol descriptor and the adversary. The protocol descriptor, acting as the leader, chooses the protocol from a set, realizing the ideal functionality (UC-Realize). The adversary (second player or follower) then selects a strategy based on the choice made by the protocol descriptor.

RPD is used to model the rational behavior of the adversary against remaining participants who are honest, allowing for the relaxation of multiple results because adversaries do not launch attacks that are possible but heavily disincentivized. In the RPD analysis of Bitcoin, a more robust notion of strong attack-payoff security is introduced. However, RPD has certain limitations, such as the assumption that the number of miners is rational, the mining difficulty, block rewards change over time, and the cryptocurrency to fiat currency conversion rate is static. Moreover, the RPD system fails to capture the difference between parties that follow the protocol honestly and those that deviate only if it gives them a higher payoff. The RPD is performed on Bitcoin, analyzing double-spending in case of a 51% attack. However, forking and double-spending are possible even for an adversary with $\beta_{adv} < ½$ without the help of other miners deviating.

Additionally, the existing method is concerned with security analysis in the case of honest and adversarial miners present in the blockchain, simulating a Markov decision process. Furthermore, the existing system only describes block withholding attacks for the security analysis of protocols, without addressing transaction withholding attacks. Moreover, the existing methods detect abnormal behavior in the network, which has a very high probability of an attack, but do not describe blockchain chain quality or consensus efficiency.

Therefore, there arises a need to address the aforementioned technical drawbacks in existing technologies for proof of work-based blockchain.

SUMMARY

In a view of the foregoing, an embodiment herein provides a system for detecting and neutralizing a plurality of security attacks on a blockchain network to improve the security of the blockchain network. The system includes a sender node that is configured to send a transaction to a user device associated with at least one user. The transaction is stored in a first block associated with a first blockchain associated with the blockchain network. The blockchain network is configured to receive the transaction from the sender node when the first block gets validated in the first blockchain. The blockchain network includes the first blockchain and a second blockchain. The blockchain network is configured to validate the transaction of the first block by comparing last bits of a hash of the first block of the transaction concatenated with a parent block and the last bits of the hash of the first block of a destination address associated with the at least one user concatenated with the parent block to neutralize the first attack. The first attack is determined using a transaction inclusion protocol. The blockchain network is configured to determine a second attack by initiating a split in the first blockchain to determine the second blockchain. The split is initiated when a height of the first blockchain is less than a threshold gap. The threshold gap is a distance from the first blockchain at which the second blockchain is determined. The second blockchain is associated with a mining power exceeding that of the first blockchain with a probability. The blockchain network is configured to invalidate the second blockchain when a latest block of the first blockchain invalidates the second block of the second blockchain when a proof of invalidity (POI) is added to the second block to neutralize the second attack. The POT is added to any blockchain that is shorter than the first block. The first block comprises a valid transaction.

In some embodiments, the blockchain network is configured to add the valid transaction to the first block when the last bits of the hash of the first block of the transaction concatenated with a parent block and the last bits of the hash of the first block of a destination address associated with the user concatenated with the parent block is equal.

In some embodiments, the POT is a broadcasted transaction on a splitted blockchain to substantiate an invalidity of the second blockchain (i) when the second block is indistinguishable from any other block, (ii) the POT is not added on the first blockchain and invalidated the first blockchain, and (iii) the height of the first blockchain is higher than the height at which the POT is added to the second blockchain.

In some embodiments, the transaction is transferred using an input secret, wherein the input secret is a hash of the second block.

In some embodiments, the probability of adding the POI on the first blockchain is negligible.

In some embodiments, the plurality of security attacks in the blockchain network is disincentivized when (i) the at least one user validates the second blockchain, (ii) a rational user is disincentivized to validate the second blockchain due to a block reward not being higher than mining on the first blockchain, and (iii) there is a risk of a honest user validating the first block or a valid POI transaction included in the second blockchain if the plurality of security attacks continue in the blockchain network, which decreases with a negligible probability.

In one aspect, a method for detecting and neutralizing a plurality of security attacks on a blockchain network to improve security of the blockchain network is provided. The method includes configuring a sender node to send a transaction to a user device associated with at least one user. The transaction is stored in a first block associated with a first blockchain associated with a blockchain network. The method includes receiving, by the blockchain network, the transaction from the sender node when the first block gets validated in the first blockchain. The blockchain network comprises the first blockchain and a second blockchain. The method includes validating the transaction of the first block by comparing last bits of a hash of the first block of the transaction concatenated with a parent block and the last bits of the hash of the first block of a destination address associated with the at least one user concatenated with the parent block to neutralize the first attack. The first attack is determined using a transaction inclusion protocol. The method includes determining a second attack by initiating a split in the first blockchain to determine the second blockchain. The split is initiated when a height of the first blockchain is less than a threshold gap. The threshold gap is a distance from the first blockchain at which the second blockchain is determined. The second blockchain is associated with a mining power exceeding that of the first blockchain with a probability. The method includes invalidating the second blockchain when the first block of the first blockchain validates the second block of the second blockchain when a proof of invalidity (POI) is added to the second block to neutralize the second attack. The POT is added to any blockchain that is shorter than the first block, wherein the first block comprises a valid transaction.

In some embodiments, the blockchain network is configured to add the valid transaction to the first block when the last bits of the hash of the first block of the transaction concatenated with a parent block and the last bits of the hash of the first block of a destination address associated with the user concatenated with the parent block is equal.

In some embodiments, the POT is a broadcasted transaction on a splitted blockchain to substantiate an invalidity of the second blockchain (i) when the second block is indistinguishable from any other block, (ii) the POI is not added on the first blockchain and invalidated the first blockchain, and (iii) the height of the first blockchain is higher than the height at which the POT is added to the second blockchain.

In some embodiments, the transaction is transferred using an input secret, wherein the input secret is a hash of the second block.

In some embodiments, the probability of adding the POT on the first blockchain is negligible.

In some embodiments, the plurality of security attacks in the blockchain network is disincentivized when (i) the at least one user validates the second blockchain, (ii) a rational user is disincentivized to validate the second blockchain due to a block reward not being higher than mining on the first blockchain, and (iii) there is a risk of an honest user validating the first block or a valid POI transaction included in the second blockchain if the plurality of security attacks continue in the blockchain network, which decreases with a negligible probability.

In another aspect, one or more non-transitory computer-readable storage mediums store one or sequences of instructions, which when executed by one or more processors, causes a method for detecting and neutralizing a plurality of security attacks on a blockchain network to improve security of the blockchain network. The method includes configuring a sender node to send a transaction to a user device associated with at least one user. The transaction is stored in a first block associated with a first blockchain associated with a blockchain network. The method includes receiving, by the blockchain network, the transaction from the sender node when the first block gets validated in the first blockchain. The blockchain network comprises the first blockchain and a second blockchain. The method includes validating the transaction of the first block by comparing last bits of a hash of the first block of the transaction concatenated with a parent block and the last bits of the hash of the first block of a destination address associated with the at least one user concatenated with the parent block to neutralize the first attack. The first attack is determined using a transaction inclusion protocol. The method includes determining a second attack by initiating a split in the first blockchain to determine the second blockchain. The split is initiated when a height of the first blockchain is less than a threshold gap. The threshold gap is a distance from the first blockchain at which the second blockchain is determined. The second blockchain is associated with a mining power exceeding that of the first blockchain with a probability. The method includes invalidating the second blockchain when the first block of the first blockchain validates the second block of the second blockchain when a proof of invalidity (POI) is added to the second block to neutralize the second attack. The POI is added to any blockchain that is shorter than the first block, wherein the first block comprises a valid transaction.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed descriptions with reference to the drawings, in which.

DETAILED DESCRIPTION OF PREFERRED EMBODIMENTS

Figure 1:
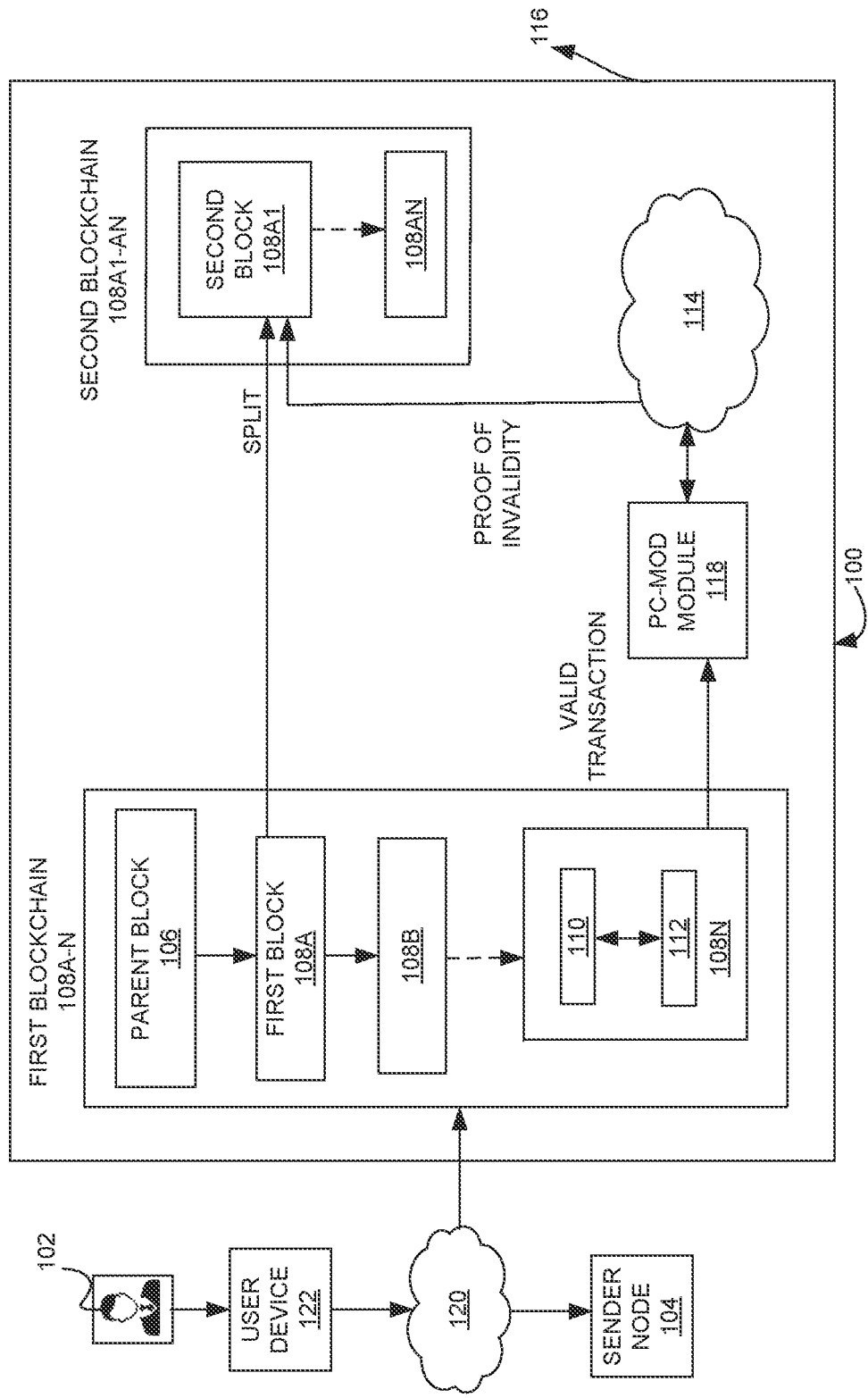
FIG. 1 is a block diagram that illustrates a system for detecting and neutralizing a plurality of security attacks on a blockchain network to improve security of the blockchain network according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved approach that overcomes technical drawbacks and delays in existing technologies for proof-of-work-based blockchain. The embodiments herein achieve this by securing a proof-of-work-based blockchain by detecting and neutralizing one or more security attacks. This enables scalability, increases valid transaction processing speed while maintaining security improves network fairness, and is immune against incentive-driven deviations. Referring now to the drawings and more particularly to FIGS. 1 through 4, where similar reference characters denote corresponding features consistently throughout the figures, there are shown preferred embodiments.

FIG. 1 is a block diagram that illustrates a system 100 for detecting and neutralizing a plurality of security attacks on a blockchain network to improve security of the blockchain network according to some embodiments herein. The system 100 includes a user 102, a sender node 104, a user device 122, and a blockchain network 116. The blockchain network 116 includes a transaction mempool 114, a parent block 106, a first blockchain 108A-N, and a second blockchain 108A1-AN. The first blockchain 108A-N may be an honest blockchain. The second blockchain 108A1-AN may be an adversary blockchain. In some embodiments, a chain of blocks has the parent block 106. The parent block 106 may be mined just before the current block. The first blockchain 108A-N includes one or more first blocks. The blockchain system 100 transmits one or more transactions that are valid to the one or more first blocks via a network 120. The network may be a local area network (LAN), a wide area network (WAN), a public network, a private network, a proprietary network, a public telephone switched network (PSTN), the Internet, a wireless network, a virtual network, or any combination thereof. The one or more first block may be any node in the first blockchain 108A-N. Each first block may comprise a memory 110 that stores a set of instructions and a processor 112 that is configured to execute the set of instructions to perform one or more operations related to transaction validation and transaction inclusion. thereby enabling scalability and network fairness. Each first block 108A stores a blockchain locally. Each first block may be but is not limited to, a computer, a mobile terminal, or any dedicated electronic device with a computing ability to validate the transactions and add the valid transaction in the first blockchain 108-N.

The second blockchain 108A1-AN includes one or more second blocks. The sender node 104 is configured to send a transaction to the user device 122 through the network 120 associated with the user 102. The sender node 104 may include, but is not limited to, a personal computer, a laptop, a tablet device, a smartphone, a mobile communication device, a personal digital assistant, any other such computing device, or any virtual device. The user device 122 may include, but is not limited to, a personal computer, a laptop, a tablet device, a smartphone, a mobile communication device, a personal digital assistant, any other such computing device, or any virtual device.

The transaction is stored in a first block 108A associated with the first blockchain 108A-N associated with the blockchain network 116. The transaction mempool 114 stores one or more transactions that are broadcasted by the one or more sender nodes after validating the transactions. The transaction mempool 114 is communicatively coupled with each node in the blockchain system 100. The blockchain system 100 may store the one or more transactions in the transaction mempool 114 after the one or more sender nodes initiate the transactions.

The blockchain network 116 is configured to receive the transaction from the sender node 102 when the first block gets validated in the first blockchain 108A-N. The blockchain network 116 includes the first blockchain 108A-N and a second blockchain 108A1-AN. The blockchain network 116 is configured to validate the transaction of the first block 108A by comparing last bits of a hash of the first block 108A of the transaction concatenated with a parent block 106 and the last bits of the hash of the first block 108A of a destination address associated with the at least one user 102 concatenated with the parent block 106 to neutralize the first attack. The first attack is determined using a transaction inclusion protocol. The transaction inclusion protocol refers to a set of rules or procedures controlling the process by which transactions are included in the blockchain network 116.

The blockchain network 116 is configured to determine a second attack by initiating a split in the first blockchain 108A-N to determine the second blockchain 108A-AN. The split is initiated when a height of the first blockchain 108A-N is less than a threshold gap. The threshold gap is a distance from the first blockchain at which the second blockchain is determined. The second blockchain 108A1-AN is associated with a mining power exceeding that of the first blockchain 108A-N with a probability. The blockchain network 116 is configured to invalidate the second blockchain 108A1-AN when a latest block 108A of the first blockchain 108A-N invalidates the second block 108A1 of the second blockchain 108A1-AN when a proof of invalidity (POI) is added to the second block 108A1 to neutralize the second attack. The POI is added to any blockchain that is shorter than the first block 108A through a PC-MOD module 118. The first block 108A comprises a valid transaction.

In some embodiments, the blockchain network is configured to add the valid transaction to the first block when the last bits of the hash of the first block of the transaction concatenated with a parent block and the last bits of the hash of the first block of a destination address associated with the user concatenated with the parent block is equal.

In some embodiments, the POT is a broadcasted transaction on a splitted blockchain to substantiate an invalidity of the second blockchain (i) when the second block is indistinguishable from any other block, (ii) the POI is not added on the first blockchain and invalidated the first blockchain, and (iii) the height of the first blockchain is higher than the height at which the POI is added to the second blockchain.

In some embodiments, the transaction is transferred using an input secret, wherein the input secret is a hash of the second block.

In some embodiments, the probability of adding the POT on the first blockchain is negligible.

In some embodiments, the plurality of security attacks in the blockchain network is disincentivized when (i) the at least one user validates the second blockchain, (ii) a rational user is disincentivized to validate the second blockchain due to a block reward not being higher than mining on the first blockchain, and (iii) there is a risk of a honest user validating the first block or a valid POI transaction included in the second blockchain if the plurality of security attacks continue in the blockchain network, which decreases with a negligible probability.

The blockchain network 116 may be operating on a peer-to-peer network. Each node in the blockchain network 116 is communicatively connected with others. The user 102 may be a miner. The user 102 may be an honest party, rational party, or adversary party. The honest party (HP) controls a $\beta_{thon}$ fraction of total mining power. The total mining power may be the total number of hashes that all miners can perform in a given timestamp. The honest party chooses to participate in an honest strategy protocol and follows the honest strategy protocol if there is a higher utility or else exits the blockchain network 116. The rational party (RP) controls a $\beta_{at}$ fraction of the total mining power. The rational party (RP) follows the honest strategy protocol if no existing better strategy offers a higher utility. In some embodiments, the rational party (RP) deviates from the honest strategy protocol. For example, a value of the crypto-currency ($\theta(t)$) doesn't get affected if the deviation is indistinguishable for an external observer (EO), or the value of the crypto-currency ($\theta(t)$) gets affected if the deviation is distinguishable for the external observer (EO) while mining. The external observer (EO) may be an observer that monitors all blockchains that are publicly broadcasted in the blockchain network 116. The external observer (EO) may represent a market response to the one or more attacks and influence modern externalities. The external observer (EO) may capture network latency, temporary forks, and delays in monitoring security attacks. For example, the external observer (EO) may consider a forked chain ($C_f$) or the splitted chain as an attack in the first blockchain ($C_H$) 108A-N. The forked chain or the splitted chain has a tolerance factor $\rho$ which leads to the one or more second blocks which again leads to the forked chain ($C_f$) and that becomes the longest chain (i.e., the honest/first blockchain 108A-N ($C_H$)). The adversarial party (AP) controls $\beta_{adv}$ fraction of the total mining power. For instance, the adversarial party (AP) is part of a Stackelberg game. The adversarial party (AP) may launch the one or more attacks and may perform deviations from the honest strategy protocol.

In an exemplary embodiment of the Stackelberg game, one or more adversary parties are treated as one adversary party. The leader of the Stackelberg game may be a protocol descriptor. The blockchain network 116 may include the external observer (EO) who determines the conversion rate $\theta(t)$. The conversion rate $\theta(t)$ is to convert the value of cryptocurrency to a fiat currency at round t. The protocol descriptor is used to choose the effective honest strategy protocol that maximizes its utility for the user 102, who follows the honest strategy protocol.

In the Stackelberg game theoretic analysis, the one or more attacks are parameterized by the tuple (F, <F>, vA, vR, vH), where F is the ideal functionality, <F> is the relaxation of the ideal functionality, allowing the possibility of the existence of a simulator (S) that simulates the one or more possible attacks in the first blockchain 108A-N. The proof of work (PoW) based blockchain considers Gledger as the ideal functionality and Gweak-ledger functionality as relaxation. The honest party, the rational party, and the adversary party have payoff vectors vH, vR, and vA respectively. Therefore, an attack model is, M=(Gledger, Gweak-ledger, vA, vR, vH).

The rational party and the honest party are not part of the Stackelberg game because the strategy of the honest party is fixed with the honest strategy protocol and the rational party fixes optimal out of the possible deviations after the adversary party selects the strategy. So, the adversary party follows a semi-honest front-running adversary strategy when the adversary party corrupts the strategy of the honest party and follows the honest strategy protocol. For example, the adversary party broadcasts a message immediately if the adversary party wants to broadcast a message in the blockchain network 116, but the adversary delays that message by one round when a non-adversarial party (HP or AP) wants to broadcast the message in the blockchain network 116.

The blockchain network 116 defines the adversary party's ideal behavior, which means the strongest security guarantee for the honest strategy protocol. The honest strategy protocol is strongly attack-payoff secure tinder the attack model (M) if the adversary party is in the semi-honest and the front-running adversary strategy (A∈Afr) so that the adversary party plays a negligible-best response strategy. That means, $\forall A2 \in ITM$ and $A1 \in Afr$. $UA(\Pi,A2) \leq UA(\Pi,A1)+negl(\kappa)$.

The blockchain network 116 may model the behavior of the rational party using externalities. The external observer changes the value of the cryptocurrency based on which strategies are followed by the user 102 in terms of conversion rate ($\theta(t)$). Therefore, the fairness regarding reward distribution among the user 102, a transaction accepted, etc., is compromised during the fairness attack when an externality parameter changes to $\theta(t)$=efairness, where efairness is smaller than the conversion rate ($\theta(t)$) when the user 102 is mining honestly. Also, the honest strategy protocol is compromised in difficulty-altering attacks, quick fork attacks, etc., when the externality parameter changes to $\theta(t)$=esecurity. The fairness attacks may be selfish mining with bribing.

In the blockchain system 100, the adversary party creates a split or a fork of the second blockchain 108A1-108AN before the last block (less than $\rho$) of the first blockchain (CH) 108A-N while validating or mining the first blockchain (CH) 108A-N via the blockchain network 116.

In an exemplary embodiment, the adversary party generates a quick fork attack or the first security attack when (i) the adversary party forks the first blockchain (CH) 108A-N at k<$\rho$ blocks before the last block on the first blockchain (CH) 108A-N, and (ii) the first blockchain (CH) 108A-N does not exceed the second blockchain 108A1-AN by more than $\rho$ blocks during the quick fork attack.

In some embodiments, the quick fork attack or the first security attack is possible when the block reward gets reduced between the attack at the k blocks from where the split or the fork is generated as the phase changes from phase Pi to Pi+1. The blockchain network 116 analyzes the existing values of $\vartheta=\vartheta i \in (0, 1)$ when the quick fork attack or the first security attack is possible with high probability, thereby, a strategy of the quick fork attack is dominant over the honest strategy protocol for the adversary party and the rational party, where $\vartheta i$ is the factor by which the block reward changes as the phase changes from the Pi to Pi+1.

In some embodiments, the block reward reduces as a phase changes. The block reward changes from $r_{block}$ to $\vartheta \cdot r_{block}$, $\vartheta < 1$ when the phase changes from the Pi to Pi+1 and the adversary party generates the quick fork with a probability of n−1/n.

In some embodiments, the quick fork attack or the first security attack is possible when a security attack is possible for $\beta_{adv} < \frac{1}{2}$ without other parties deviating. The difficulty-altering attack occurs in two consecutive epochs ei and ei+1. In the first epoch (ei), the adversary party splits or forks the first blockchain (CH) 108A-N to form the second blockchain 108A1-AN (private chain (CA)) when r1 fraction of the epoch is completed (i.e., r1λ blocks are mined). The adversary party creates the one or more second blocks of the second blockchain 108A1-AN with timestamps such that the target recalculation leads to a very low difficulty for the second blockchain 108A1-108AN in the next epoch of ei+1. At the same time, the adversary party validates or mines the one or more second blocks of the second blockchain 108A1-AN faster than the first blockchain (CH) 108A1-N. The second blockchain 108A1-AN overtakes the first blockchain 108A-N to become the longest chain as the adversary party generates one or more timestamps among the one or more second blocks of the second blockchain 108A1-AN that appear to be mined slower in the second blockchain 108A1-AN when the split or the fork is broadcasted in the blockchain network 116. Further, the broadcasted second blocks have a timestamp less than the broadcasted time (i.e., slow down an apparent mining rate). Thereby, the adversary party validates or mines the blocks in the epoch ei slower than the honest party as $\gamma_{adv} < \frac{1}{2}$, and the adversary party mines the remaining blocks (i.e., epoch ei+1) faster as the reduced difficulty of the second blockchain 108A1-AN.

In some embodiments, a security attack is possible for $\beta_{adv} < \frac{1}{2}$ without other parties deviating. The difficulty altering attack occurs in two consecutive epochs $e_i$ and $e_{i+1}$. In the first epoch ($e_i$), the adversary party splits or forks the first blockchain ($C_H$) 108A-N to form the second blockchain 108A1-AN (private chain ($C_A$)) when $r_1$ fraction of the epoch is completed. (i.e., $r_{1\lambda}$ blocks are mined). The adversary party creates the one or more second blocks of the second blockchain 108A1-AN with timestamps such that the target recalculation leads to a very low difficulty for the second blockchain 108A1-108AN in the next epoch of ei+1. At the same time, the adversary party validates or mines the one or more second blocks of the second blockchain 108A1-AN faster than the first blockchain ($C_f$) 108A1-N. The second blockchain 108A1-AN overtakes the first blockchain 108A-N to become the longest chain as the adversary party generates one or more timestamps among the one or more second blocks of the second blockchain 108A1-AN that appear to be mined slower in the second blockchain 108A1-AN when the split or the fork is broadcasted in the blockchain network 116. Further, the broadcasted second blocks have a timestamp less than broadcasted time (i. e slow down an apparent mining rate). Thereby, the adversary party validates or mines the blocks in the epoch $e_1$ slower than the honest party as the $\beta_{adv} < \frac{1}{2}$, and the adversary party mines the remaining blocks (i.e., epoch ei+i) faster as the reduced difficulty of the second blockchain 108A1-AN.

The epoch (ei) slows down the adversary party's apparent mining rate and it leads to difficulty recalculation which, in turn, allows the adversary party to mine the one or more second blocks 108A1-AN with lower difficulty values in the epoch ei+1 and overtake the first blockchain 108A-N (longest chain). The difficulty-altering is initiated when $r1 (\in [0, 1))$ fraction of the one or more first blocks 108A-N in the epoch (ei) are mined, and the second blockchain (CA) 108A1-AN overtakes the first blockchain (CH) 108A-N by the time $r2 (\in (0, 1])$ fraction of the one or more first blocks 108A-N, which is r2λ blocks are mined in the epoch ei+1, and T is the time it takes to mine all blocks in the epoch ei when the user 102 validates or mines on the same chain (CH and CA). The user 102 takes Tτhon time to validate or mine the first blockchain 108A-N (i.e., take mine all blocks in epoch ei+1), and the user 102 takes Tτadv time to mine on the second blockchain 108A1-AN when the user 102 (βadv, βhon, βrat) are mining on the same chain (CH and CA respectively).

The user 102 mines the r2 fraction of the blocks on the second blockchain 108A1-AN from epoch ei+1 faster than the first blockchain 108A-N (i.e., the adversary party overtakes the longest chain by the r2 fraction of the one or more first blocks 108A in the epoch ei+1). Thereby, the difficult altering attack is considered a security attack to be larger than the external observer's tolerance factor (ρ). The plurality of security attacks may be the quick fork or the difficult altering. The rational party and honest party are mined on the first blockchain 108A-N, and the adversary party mines on the second blockchain 108A1-AN.

$$T\tau hr2/(1-\beta_{adv}+T(1-r1)/(1-\beta_{adv}) > T(1-r1)/\beta_{adv}+Tr2\tau_{adv}/\beta_{adv}$$

The following equation depicts the adversary slowing down the apparent mining rate on CA by a factor of $\alpha/\beta_{adv}$ ($\alpha > 1$), Therefore, $\tau_{adv}$ and $\tau_{hon}$ are calculated as, $\tau_{adv} = \max(1/(r1+(\alpha(1-r1)/\beta_{adv}), \tau_{min})$, $\tau_{hon} = \max(1/(r1+(1-r1)/1-\beta_{adv}), \tau_{min})$.

In some embodiments, the first security attack or the quick fork is possible when $\tau_{min} < \frac{1}{2}$. This means the adversary party can fork the PoW blockchain using the first security attack or the difficulty-altering attack instead of the first security attack or the quick fork with a probability greater than 1−negl(Θε) if $\beta_{adv} \geq \beta_{adv}$, where (i) the Θ∝expected time to mine a block by the users, (ii) the ε is the difference in time between the adversary party and the party mining the one or more honest blocks 108A (iii) the last block of the epoch $e_{i+1}$, (iv) $\beta adv = ((3+\tau_{min})-\sqrt{(3+\Sigma_{min})2-4(\tau_{min+1})})/2$, thereby the fraction of computing power required by the adversary party is determined to generate the second security attack or the difficulty altering attack with overwhelming probability is determined ($\tau_{min} = \frac{1}{4}$).

In some embodiments, the selfish mining is possible when $\beta_{adv} < \frac{1}{4}$. In selfish mining, the adversary party mines each block privately in the second blockchain 108A1-AN and it includes a bribe transaction for being accepted in the longest chain. The rational party randomly chooses the second block from the one or more second blocks of the second blockchain 108A1-AN and validates or mines on top of the one or more second blocks of the second blockchain 108A1-AN to collect a bribe and this choice is not known to other parties (HP) or the external observer. Therefore, the total mining power mining on top of a non-adversary block is $\beta_{hon}/2$ while a total of $\beta_{hon}/2 + \beta_{adv}$, adv mining power is mining on the adversary block. Thereby, the second blockchain validates or mines one or more second blocks with a higher probability of the $\beta_{hon}/2+\beta_{Rat}+\beta_{adv}$.

The selfish mining with bribing is dominant over the honest strategy protocol for $\beta_{adv}>\beta^{SMB}$ which means easy to grab a small reward from whoever validates or mines on the second blockchain 108A1-AN. Where $\beta^{SMB}=\beta_{hon}/(2\beta_{rat}+4\beta_{hon})$ is the lower bound on $\beta_{adv}$ for which the selfish mining with the bribing attack is profitable.

In some embodiments, the bribe amount is a z fraction of the block reward for a single block (z>0, but a small value). The payoff is $(1-z)r_{block}$ for the adversary party whose mines block on top of the adversary block gets payoff $(1+z)r_{block}$ if the adversary party mined the one or more second blocks become part of the longest chain.

In some embodiments, the selfish mining with bribing attack is in different cases. the first case is a fully rational setting. In the fully rational setting, $\beta_{hon}=0$ and therefore $\gamma=1$. the selfish mining occurs for any $\beta_{adv}>0$. Therefore, an attacker is always incentivized to generate the selfish mining with a bribing attack. The second case is a mixed setting. In the mixed setting, $\beta_{hon}>0$, therefore, the selfish mining with bribing attack is feasible for the attacker become $\beta_{adv}>\beta^{SMB}$. Thereby the PRPD module 120 provides a result that selfish mining is possible with much less computing power than the previously known bound of 25% if there are rational parties.

In some embodiments, the PC-MOD module 118 allows the honest party par mining on chain $C_{par}$ at height $a_{par}$ to add the second block containing POI on the forked chain when the PC-MOD module 118 observes the quick fork that is at height$\leq a_{par}-k_{th}$. where the $k_{th}$ is a threshold gap.

The threshold gap is the distance from the longest chain or the honest blockchain 108A-N at which the forked chain ($C_f$) with $\beta_{rat}+\beta_{adv}$ mining on the honest blockchain 108A-N overtakes the longest chain ($C_H$) with probability$\leq\mu$. The threshold is defined as $k_{th}=\rho-\log \phi(\mu+\phi^\rho(1-\mu))$, where, $\phi=\beta_{hon}/(1-\beta_{hon})$ and $\rho$ is the tolerance factor of the external observer.

The PC-MOD module 118 generates the POI. The POI is a transaction that is broadcasted on the splitted or the forked chain to prove the adversary chain 108A-AN is invalid when the proof of transaction satisfies the following criteria, (i) the adversary block containing that the POI is not distinguishable from any other block or else the rational party and the adversary party ignore that means the adversary block mine on top of the parent block 106 of the adversary block, (ii) the adversary party should not be able to add the POI on the honest blockchain and invalidate the honest blockchain 108A-N, and (iii) the height apar in Cpar is higher than the height at which adds the POI in the adversary chain 108A-AN ($C_A$).

In some embodiments, the transaction is redeemed by providing an input secret such that h=H(secret), where secret=$H_{par}||m_{secret}$. The m secret is an arbitrary secret string chosen by $H_{apar}$ and is a hash of a block mined on the $C_{par}$ at height apar. In some embodiments, the honest party can only spot a h and not a secret at the time of adding the POI.

In some embodiments, the probability of the honest party adding the POI on the second blockchain 108A-AN ($C_A$) is at least $1-e^{-\beta_{hon}\cdot kth}$. The second blockchain 108A1-AN ($C_A$) trails behind the first blockchain 108A-N by kth blocks. The honest party can add PO in the $k_{th}$ blocks of the adversary blockchain 108A i-AN as the height at which the POT is present is less than the height of the first blockchain 108A-N whose hash it contains. Therefore, the adversary party mines the block among the $k_{th}$ blocks of the adversary blockchain 108A1-AN, thereby the honest party adds the POI.

In some embodiments, $E_{mit}$ be a chance that the honest party mines the block in the $k_{th}$ blocks by P[Emit]=1−(1−$\beta_{hon})^{kth}>(1-e^{\beta honkth})$.

The honest party broadcast the POI transaction in the transaction mempool 114. In some embodiments, the PoW blockchain protocol with the PC-MOD is an equilibrium for the rational party to mine on the longest chain and not to shift to the second blockchain 108A1-AN and is secure against the quick fork attack for $\beta_{adv}<\frac{1}{2}$ with overwhelming probability.

The PC-MOD module 118 mandates the honest party to mine on the second blockchain 108A1-AN unless the POI transaction of the honest party is included in one of the one or more second blocks in the second blockchain 108A1-AN. Thereby, the generating of the quick fork attack in the blockchain network 116 is disincentivized when (i) the $\beta_{adv}+\beta_{rat}+\beta_{hon}$ parties mine on the second blockchain 108A1-AN (ii) the rational party is disincentivized to mine on the second blockchain 108A1-AN and as the block reward is not higher than mining on the first blockchain 108A-N or the longest chain ($C_H$) if the rational party shifts to mining on the second blockchain 108A1-AN, so that a mining cost on the first blockchain 108A-N or the longest chain ($C_H$) between on $C_H$-$C_H^{kth}$ is wasted and the honest party implying lesser utility than mining on the longest chain ($C_H$), and (iii) risk of the honest party mining the block or a valid POI transaction is included in the second blockchain 108A1-AN if the quick fork attack or the first security attack continues in the blockchain network 116 which decreases $\theta(t)$ to es$_{ecurity}$ with probability $>(1-(1-\beta_{hon})^{kt})$. Therefore, the PC-MOD module 118 disincentivizes the rational party to participate in the quick fork attack or the first security attack.

In some embodiments, the rational party does not mine on a forked or a splitted blockchain. If the k>ρ as the quick fork or the first security attack is observed as an attack by the external observer and the conversion rate $\theta(t)$ of the cryptocurrency falls to $e_{security}$. Thereby, the rational party does not shift to the fork or the split and the second block 108A1-AN does not overtake the first blockchain (Cu) 108A-N.

Figure 2:
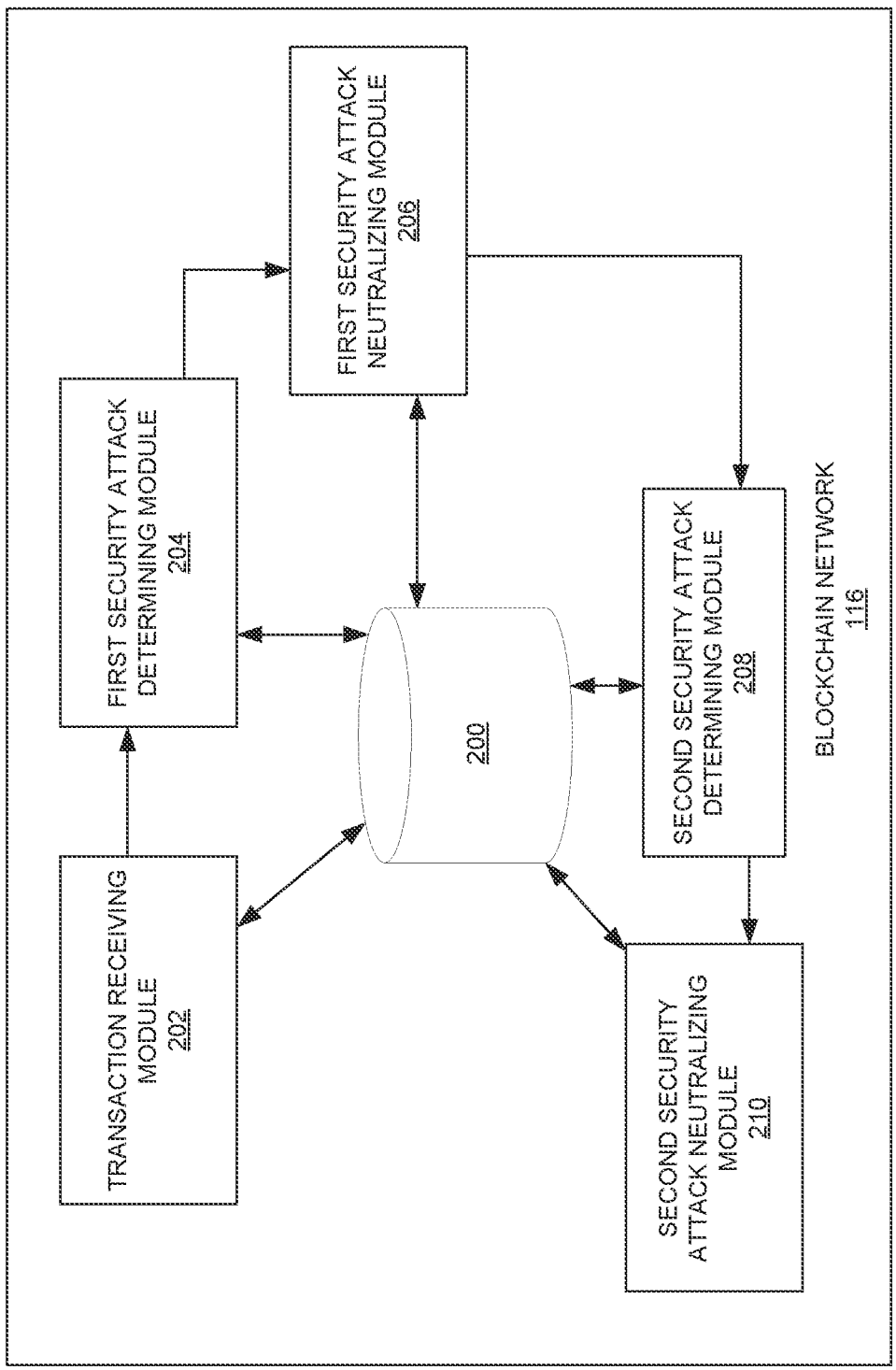
FIG. 2 is a block diagram that illustrates one or more modules of a blockchain system of FIG. 1 according to some embodiments herein.

FIG. 2 is a block diagram that illustrates one or more modules of the blockchain network 116 of FIG. 1, according to some embodiments herein. The blockchain network 116 includes a transaction receiving module 202, a first security attack determining module 204, a first security attack neutralizing module 206, a second security attack determining module 208, a second security attack neutralizing module 210, and a database 200. The database 200 is communicatively connected with each module of the blockchain network 116.

The transaction receiving module 202 receives, by the blockchain network, the transaction from the sender node when the first block gets validated in the first blockchain. The blockchain network includes the first blockchain and a second blockchain. The first security attack determining module 204 determines using a transaction inclusion protocol. The first security attack neutralizing module 206 validates the transaction of the first block by comparing last bits of a hash of the first block of the transaction concatenated with a parent block and the last bits of the hash of the first block of a destination address associated with the at least one user concatenated with the parent block. Thereby, the first security attack neutralizing module 206 neutralizes the first attack. The second security attack determining module 208 determines a second attack by initiating a split in the first blockchain to determine the second blockchain. The split is initiated when a height of the first blockchain is less than a threshold gap. The threshold gap is a distance from the first blockchain at which the second blockchain is determined. The second blockchain is associated with a mining power exceeding that of the first blockchain with a probability. The second security attack neutralizing module 210 invalidates the second blockchain when the first block of the first blockchain validates the second block of the second blockchain when a proof of invalidity (POT) is added to the second block. Thereby, the second security attack neutralizing module 210 neutralizes the second attack. The POI is added to any blockchain that is shorter than the first block. The first block includes a valid transaction.

Figure 3:
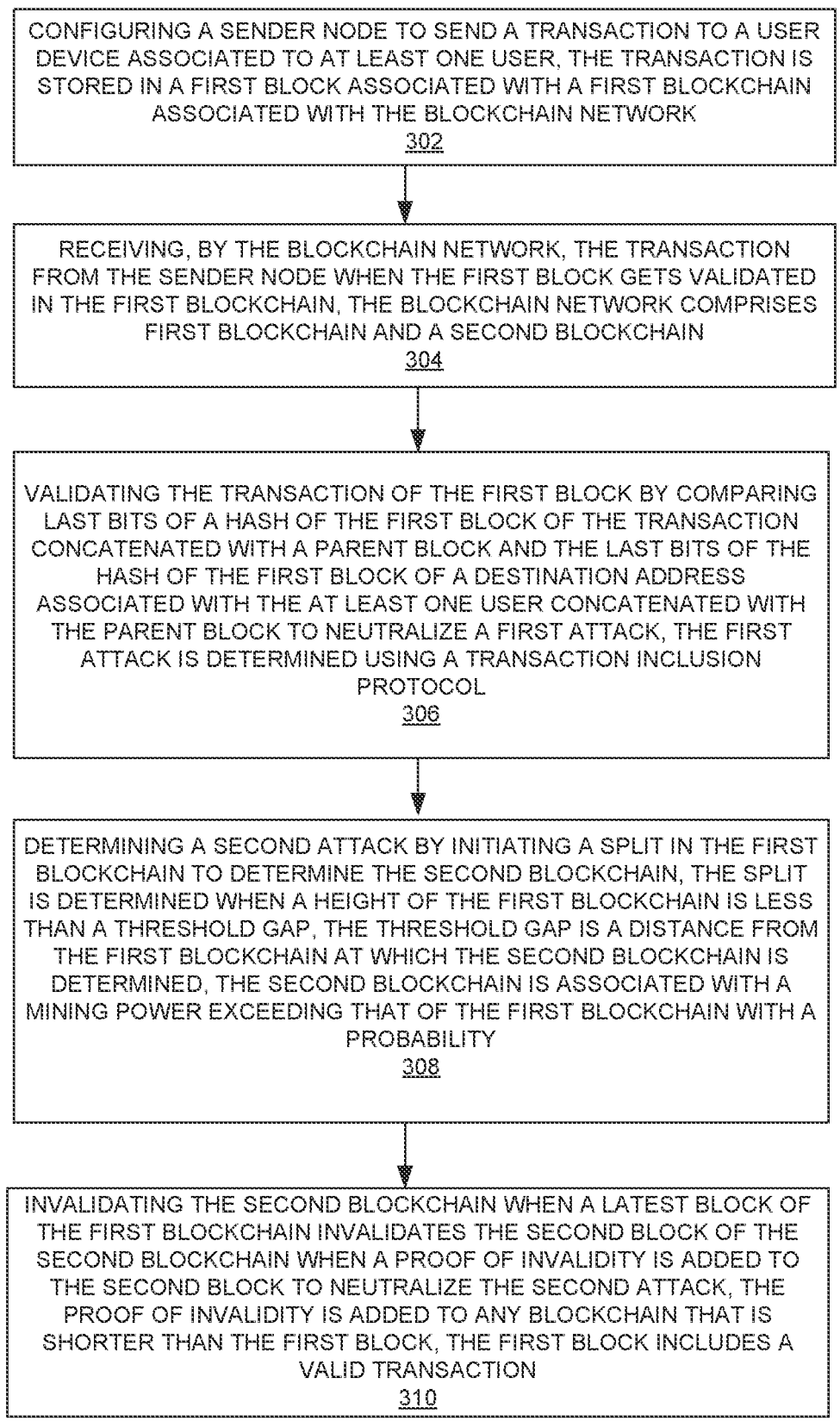
FIG. 3 is a flow chart that illustrates a method for detecting and neutralizing a plurality of security attacks on a blockchain network to improve security of the blockchain network according to some embodiments herein.

FIG. 3 is a flow chart that illustrates a method for detecting and neutralizing a plurality of security attacks on a blockchain network to improve security of the blockchain network according to some embodiments herein. At a step 302, the method includes configuring a sender node to send a transaction to a user device associated with at least one user. The transaction is stored in a first block associated with a first blockchain associated with a blockchain network. At a step 304, the method includes receiving, by the blockchain network, the transaction from the sender node when the first block gets validated in the first blockchain. The blockchain network comprises the first blockchain and a second blockchain. At a step 306, the method includes validating the transaction of the first block by comparing last bits of a hash of the first block of the transaction concatenated with a parent block and the last bits of the hash of the first block of a destination address associated with the at least one user concatenated with the parent block to neutralize the first attack. The first attack is determined using a transaction inclusion protocol. At a step 308, the method includes determining a second attack by initiating a split in the first blockchain to determine the second blockchain. The split is initiated when a height of the first blockchain is less than a threshold gap. The threshold gap is a distance from the first blockchain at which the second blockchain is determined. The second blockchain is associated with a mining power exceeding, that of the first blockchain with a probability. At a step 310, the method includes invalidating the second blockchain when a latest block of the first blockchain invalidates the second block of the second blockchain when a proof of invalidity (POT) is added to the second block to neutralize the second attack. The POT is added to any blockchain that is shorter than the first block, wherein the first block comprises a valid transaction.

Figure 4:
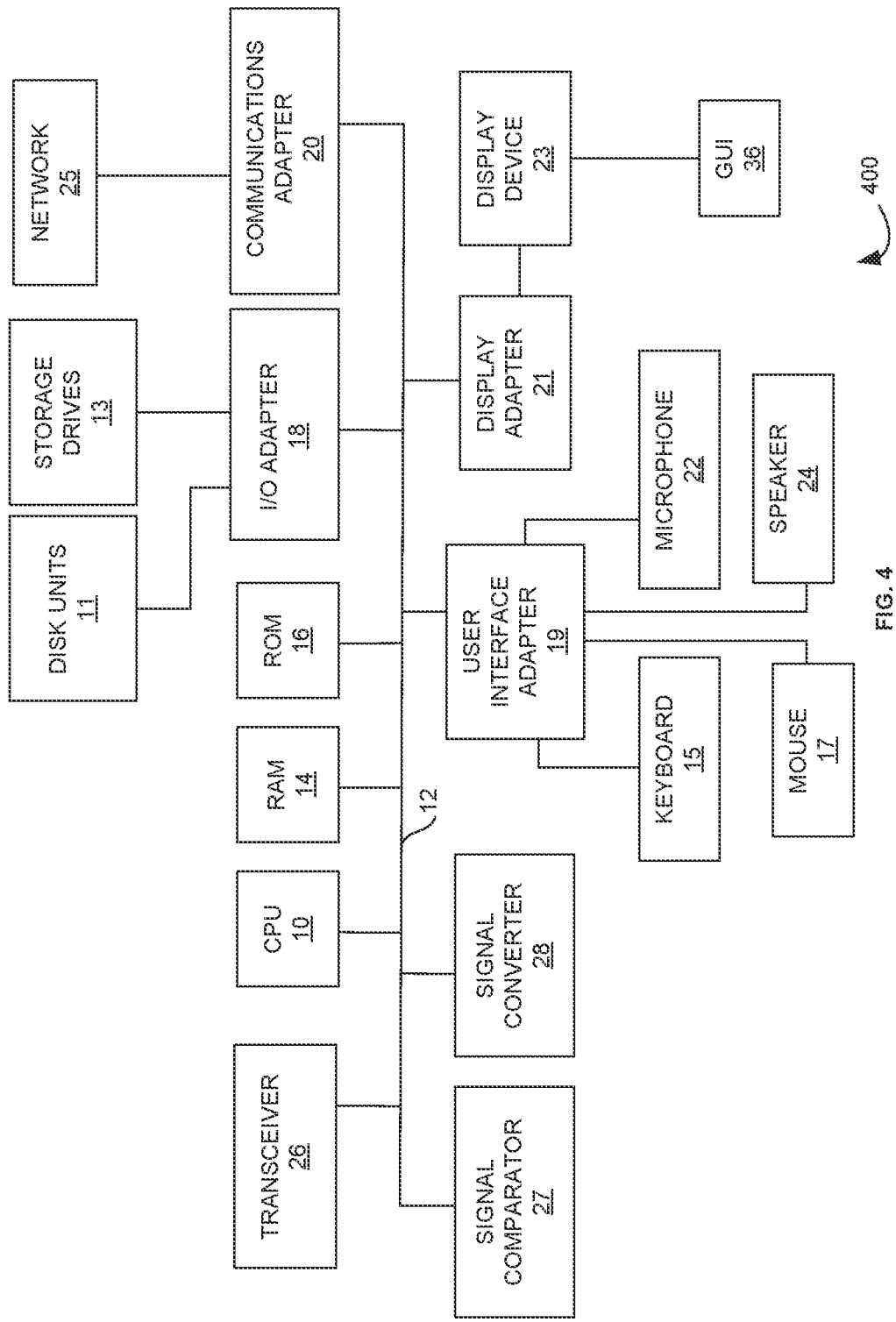
FIG. 4 is a schematic diagram of computer architecture, in accordance with the embodiments herein.

A representative hardware environment for practicing the embodiments herein is depicted in FIG. 4 with reference to FIGS. 1 through 3. This schematic drawing FIG. 4 illustrates a hardware configuration of a blockchain system or a sender node a miner node or a receiver node, in accordance with the embodiments herein. The hardware configuration includes at least one processing device and a cryptographic processor 10. The blockchain system 400 may include one or more a personal computer, a laptop, a tablet device, a smartphone, a mobile communication device, a personal digital assistant, or any other such computing device, in one example embodiment. The system 400 includes one or more processor (e.g., the processor) or central processing unit (CPU) 10. The CPUs 10 are interconnected via system bus 12 to various devices such as a random-access memory (RAM) 14, read-only memory (ROM) 16, and an input/output (I/O) adapter 18. Although, CPUs 10 are depicted, it is to be understood that the system 400 may be implemented with only one CPU.

The I/O adapter 18 can connect to peripheral devices, such as disk units 11 and storage drives 13 (tape drives), or other program storage devices that are readable by the system. The system 400 can read the inventive instructions on the program storage devices and follow these instructions to execute the methodology of the embodiments herein. The system 400 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a network 25, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few currently available network adapters.

The blockchain system for securing a proof-of-work-based blockchain using game theory is provided. The blockchain system analyzes possible attacks when $\beta_{adv}<\frac{1}{2}$, thereby preventing forks in the blockchain network. The PoW blockchain is strongly attack-payoff secure if the reward scheme satisfies all-honest-profitability under inflationary reward schemes and $\beta_{adv}<\frac{1}{2}$ in the practical rational protocol. The conversion rate of cryptocurrency value is dynamic based on the strategies followed by the miners, minimizing the imbalance payoff for miners, both those who follow the honest strategy protocol and those who deviate from it, to prevent forking. The rational party and the honest party are indistinguishable, as both can potentially deviate from the original protocol. Additionally, the rational party receives a lower block reward if it deviates from the honest strategy protocol or follows certain strategies, incentivizing the rational party to adhere to the honest strategy protocol.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A system for detecting and neutralizing a plurality of security attacks on a blockchain network to improve security of the blockchain network, the system comprises:
    a sender node comprising a hardware processor that is configured to send a transaction to a user device associated with at least one user, wherein the transaction is stored in a first block associated with a first blockchain associated with the blockchain network;
    the blockchain network that is configured to receive the transaction from the sender node, when the first block gets validated in the first blockchain, wherein the blockchain network comprises the first blockchain and a second blockchain, wherein the blockchain network is configured to:
    validate the transaction of the first block by comparing last bits of a hash of the first block of the transaction concatenated with a parent block and the last bits of the hash of the first block of a destination address associated with the at least one user concatenated with the parent block to neutralize the first attack, wherein the first attack is determined using a transaction inclusion protocol;
    determine a second attack by initiating a split in the first blockchain to determine the second blockchain, wherein the split is initiated when a height of the first blockchain is less than a threshold gap, wherein the threshold gap is a distance from the first blockchain at which the second blockchain is determined, wherein the second blockchain is associated with a mining power exceeding that of the first blockchain with a probability; and
    invalidate the second blockchain when a latest block of the first blockchain invalidates a second block of the second blockchain when a proof of invalidity (POI) is added to the second block to neutralize the second attack, wherein the POI is added to any blockchain that is shorter than the first block, wherein the first block comprises a valid transaction.

2. The system of claim 1, wherein the blockchain network is configured to add the valid transaction to the first block when the last bits of the hash of the first block of the transaction concatenated with the parent block and the last bits of the hash of the first block of a destination address associated with the user concatenated with the parent block is equal.

3. The system of claim 1, wherein the POI is a broadcasted transaction on a splitted blockchain to substantiate an invalidity of the second blockchain (i) when the second block is indistinguishable from any other block, (ii) the POI is not added on the first blockchain and invalidated the first blockchain, and (iii) the height of the first blockchain is higher than the height at which the POI is added to the second blockchain.

4. The system of claim 1, wherein the transaction is transferred using an input secret, wherein the input secret is a hash of the second block.

5. A method for detecting and neutralizing a plurality of security attacks on a blockchain network to improve security of the blockchain network, the method comprises:
    configuring a sender node comprising a hardware processor to send a transaction to a user device associated with at least one user, wherein the transaction is stored in a first block associated with a first blockchain associated with the blockchain network;
    receiving, by the blockchain network, the transaction from the sender node when the first block gets validated in the first blockchain, wherein the blockchain network comprises the first blockchain and a second blockchain;
    validating the transaction of the first block by comparing last bits of a hash of the first block of the transaction concatenated with a parent block and the last bits of the hash of the first block of a destination address associated with the at least one user concatenated with the parent block to neutralize the first attack, wherein the first attack is determined using a transaction inclusion protocol;
    determining a second attack by initiating a split in the first blockchain to determine the second blockchain, wherein the split is initiated when a height of the first blockchain is less than a threshold gap, wherein the threshold gap is a distance from the first blockchain at which the second blockchain is determined, wherein the second blockchain is associated with a mining power exceeding that of the first blockchain with a probability; and
    invalidating the second blockchain when a latest block of the first blockchain invalidates a second block of the second blockchain when a proof of invalidity (POI) is added to the second block to neutralize the second attack, wherein the POI is added to any blockchain that is shorter than the first block, wherein the first block comprises a valid transaction.

6. The method of claim 5, wherein the method further comprises adding the valid transaction to the first block when the last bits of the hash of the first block of the transaction concatenated with the parent block and the last bits of the hash of the first block of a destination address associated with the user concatenated with the parent block is equal.

7. The method of claim 5, wherein the POI is a broadcasted transaction on a splitted blockchain to substantiate an invalidity of the second blockchain (i) when the second block is indistinguishable from any other block, (ii) the POI is not added on the first blockchain and invalidated the first blockchain, and (iii) the height of the first blockchain is higher than the height at which the POI is added to the second blockchain.

8. The method of claim 5, wherein the transaction is transferred using an input secret, wherein the input secret is a hash of the second block.

9. One or more non-transitory computer-readable storage mediums storing one or sequences of instructions, which when executed by one or more processors, causes a method for detecting and neutralizing a plurality of security attacks on a blockchain network to improve security of the blockchain network, the method comprises:

configuring a sender node comprising a hardware processor to send a transaction to a user device associated with at least one user, wherein the transaction is stored in a first block associated with a first blockchain associated with the blockchain network;

receiving, by the blockchain network, the transaction from the sender node when the first block gets validated in the first blockchain, wherein the blockchain network comprises the first blockchain and a second blockchain;

validating the transaction of the first block by comparing last bits of a hash of the first block of the transaction concatenated with a parent block and the last bits of the hash of the first block of a destination address associated with the at least one user concatenated with the parent block to neutralize a first attack, wherein the first attack is determined using a transaction inclusion protocol;

determining a second attack by initiating a split in the first blockchain to determine the second blockchain, wherein the split is initiated when a height of the first blockchain is less than a threshold gap, wherein the threshold gap is a distance from the first blockchain at which the second blockchain is determined, wherein the second blockchain is associated with a mining power exceeding that of the first blockchain with a probability; and invalidating the second blockchain when the first block of the first blockchain validates a second block of the second blockchain when a proof of invalidity (POI) is added to the second block to neutralize the second attack, wherein the POI is added to any blockchain that is shorter than the first block, wherein the first block comprises a valid transaction.

* * * * *